(12) United States Patent
Tomescu et al.

(10) Patent No.: US 11,365,691 B2
(45) Date of Patent: Jun. 21, 2022

(54) BLADE ANGLE POSITION FEEDBACK SYSTEM WITH EMBEDDED MARKERS

(71) Applicant: PRATT & WHITNEY CANADA CORP., Longueuil (CA)

(72) Inventors: Dana Tomescu, Brampton (CA); James Jarvo, Saint-Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 87 days.

(21) Appl. No.: 16/600,400

(22) Filed: Oct. 11, 2019

(65) Prior Publication Data

US 2021/0070424 A1 Mar. 11, 2021

Related U.S. Application Data

(60) Provisional application No. 62/896,163, filed on Sep. 5, 2019, provisional application No. 62/896,157, filed on Sep. 5, 2019.

(51) Int. Cl.
*B64C 11/30* (2006.01)
*F02C 9/22* (2006.01)
(Continued)

(52) U.S. Cl.
CPC .............. *F02C 9/22* (2013.01); *B64C 11/301* (2013.01); *B64C 27/473* (2013.01); *B64C 27/57* (2013.01); *B64D 27/10* (2013.01); *F01D 7/00* (2013.01); *F01D 17/06* (2013.01); *F01D 17/20* (2013.01); *F01D 21/003* (2013.01); *F02D 29/02* (2013.01);
(Continued)

(58) Field of Classification Search
CPC ..... B64C 11/301; B64C 27/473; B64C 27/57; F02C 9/22; B64D 27/10; F01D 7/00; B01D 17/20; F02D 29/02; G01D 5/125
See application file for complete search history.

(56) References Cited

U.S. PATENT DOCUMENTS

| 4,934,901 A | 6/1990 | Duchesneau |
| 5,897,293 A | 4/1999 | Arel et al. |

(Continued)

FOREIGN PATENT DOCUMENTS

| DE | 102010041444 | 3/2012 |
| EP | 0353076 | 1/1990 |

*Primary Examiner* — Gonzalo Laguarda
(74) *Attorney, Agent, or Firm* — Norton Rose Fulbright Canada LLP

(57) ABSTRACT

There is provided a blade angle feedback system for an aircraft-bladed rotor rotatable about a longitudinal axis and having an adjustable blade pitch angle. A feedback device is coupled to rotate with the rotor and to move along the axis with adjustment of the blade pitch angle. The feedback device comprises a body having position marker(s) embedded therein, the body made of a first material having a first magnetic permeability and the position marker(s) comprising a second material having a second magnetic permeability greater than the first. Sensor(s) are positioned adjacent the feedback device and configured for producing, as the feedback device rotates about the axis, sensor signal(s) in response to detecting passage of the position marker(s). A control unit is communicatively coupled to the sensor(s) and configured to generate a feedback signal indicative of the blade pitch angle in response to the sensor signal(s) received from the sensor(s).

9 Claims, 12 Drawing Sheets

(51) Int. Cl.
| | |
|---|---|
| *F02D 29/02* | (2006.01) |
| *G01D 5/12* | (2006.01) |
| *B64D 27/10* | (2006.01) |
| *F01D 7/00* | (2006.01) |
| *F01D 17/20* | (2006.01) |
| *F01D 21/00* | (2006.01) |
| *B64C 27/473* | (2006.01) |
| *B64C 27/57* | (2006.01) |
| *F01D 17/06* | (2006.01) |
| *G01D 5/14* | (2006.01) |
| *G01D 5/20* | (2006.01) |
| *G01P 3/487* | (2006.01) |
| *G01P 3/488* | (2006.01) |
| *F02C 7/32* | (2006.01) |
| *B63H 3/00* | (2006.01) |
| *B64C 11/06* | (2006.01) |
| *F02D 41/28* | (2006.01) |

(52) U.S. Cl.
CPC ............ *G01D 5/125* (2013.01); *G01D 5/145* (2013.01); *G01D 5/2013* (2013.01); *G01P 3/487* (2013.01); *G01P 3/488* (2013.01); *B63H 2003/006* (2013.01); *B64C 11/06* (2013.01); *B64C 2027/4733* (2013.01); *F02C 7/32* (2013.01); *F02D 2041/281* (2013.01); *F02D 2041/288* (2013.01); *F05B 2270/328* (2013.01); *F05D 2220/323* (2013.01); *F05D 2260/70* (2013.01); *F05D 2270/02* (2013.01); *F05D 2270/80* (2013.01); *F05D 2270/821* (2013.01); *F05D 2300/507* (2013.01)

(56) References Cited

U.S. PATENT DOCUMENTS

| | | | |
|---|---|---|---|
| 5,913,659 | A | 6/1999 | Doolin et al. |
| 6,077,040 | A | 6/2000 | Pruden et al. |
| 6,213,713 | B1* | 4/2001 | Dickmann .............. B63H 3/00 416/61 |
| 7,019,517 | B2* | 3/2006 | Hagan .................. G01D 5/145 324/207.2 |
| 7,579,827 | B2 | 8/2009 | Burns et al. |
| 8,303,251 | B2* | 11/2012 | Loh ........................ F03D 7/042 416/48 |
| 8,687,206 | B2 | 4/2014 | Hockaday |
| 9,638,548 | B2 | 5/2017 | Mialtu et al. |
| 9,821,901 | B2 | 11/2017 | Duke et al. |
| 9,823,092 | B2 | 11/2017 | David et al. |
| 10,889,367 | B2* | 1/2021 | Kudrna ................... G01D 5/20 |
| 2014/0007591 | A1 | 1/2014 | Khibnik et al. |
| 2018/0050789 | A1 | 2/2018 | Marone et al. |
| 2018/0304991 | A1 | 10/2018 | Kudrna et al. |
| 2019/0234766 | A1* | 8/2019 | Miller ................ B64D 45/0005 |
| 2020/0339244 | A1* | 10/2020 | Tomescu ................ G01D 5/145 |
| 2021/0016870 | A1* | 1/2021 | Tomescu ................ B64C 11/301 |
| 2021/0061454 | A1* | 3/2021 | Tomescu ................ B64C 11/301 |
| 2021/0071589 | A1* | 3/2021 | Tomescu ................ F01D 17/20 |

* cited by examiner

BLADE ANGLE POSITION FEEDBACK SYSTEM WITH EMBEDDED MARKERS

CROSS REFERENCE TO RELATED APPLICATIONS

This patent application claims priority of U.S. provisional Application Ser. No. 62/896,157 and U.S. provisional Application Ser. No. 62/896,163, filed on Sep. 5, 2019, the entire contents of which are hereby incorporated by reference.

TECHNICAL FIELD

The present disclosure relates generally to engines, and more specifically to blade angle position feedback systems.

BACKGROUND OF THE ART

On featherable aircraft propeller systems, it is desirable to accurately measure the propeller blade pitch (or beta) angle to ensure that the blade angle is controlled according to the engine power set-point requested, such as in reverse and low pitch situations, also known as the beta operating region. For this purpose, some propeller feedback systems use a beta or feedback device, sometimes referred to as a phonic wheel, which rotates with the engine. The feedback device has multiple readable raised markers disposed on an outer surface thereof, and a sensor can be used to measure the rotation of the feedback device via the markers, providing a proxy value for the rotational velocity of the engine, as well as measure blade angle. Existing feedback devices are however vulnerable to reading errors. In addition, existing feedback devices are generally manufactured from heavy metallic materials such as steel and weight reduction is desired in aircraft systems.

Therefore, improvements are needed.

SUMMARY

In accordance with a broad aspect, there is provided a blade angle feedback system for an aircraft-bladed rotor, the rotor rotatable about a longitudinal axis and having an adjustable blade pitch angle. The system comprises a feedback device coupled to rotate with the rotor and to move along the longitudinal axis with adjustment of the blade pitch angle, the feedback device comprising a body having at least one position marker embedded therein, the body made of a first material having a first magnetic permeability and the at least one position marker comprising a second material having a second magnetic permeability greater than the first magnetic permeability, at least one sensor positioned adjacent the feedback device and configured for producing, as the feedback device rotates about the longitudinal axis, at least one sensor signal in response to detecting passage of the at least one position marker, and a control unit communicatively coupled to the at least one sensor and configured to generate a feedback signal indicative of the blade pitch angle in response to the at least one sensor signal received from the at least one sensor.

In some embodiments, the at least one sensor is positioned adjacent an exposed surface of the feedback device, and the at least one position marker is embedded in the body substantially flush with the surface.

In some embodiments, the at least one sensor is positioned adjacent an exposed surface of the feedback device, and the at least one position marker is recessed relative to the surface by a predetermined distance.

In some embodiments, the at least one sensor is positioned adjacent an exposed surface of the feedback device, and the at least one position marker extends from the surface by a predetermined distance.

In some embodiments, the feedback device comprises a surface having a first edge and a second edge opposite the first edge, and at least one axial groove is formed in the body and extends from the first edge to the second edge, the at least one axial groove configured to receive the second material therein to form the at least one position marker.

In some embodiments, the at least one axial groove has one of a rectangular cross-section, a semi-circular cross-section, and a U-shaped cross-section.

In some embodiments, the at least one axial groove is configured to receive therein a sheet stock made of the second material.

In some embodiments, at least part of the at least one position marker is welded in the at least one axial groove.

In some embodiments, the feedback device further comprises a non-metallic sleeve configured to be positioned over the at least one position marker for holding the at least one position marker in place within the at least one axial groove.

In some embodiments, the body is annular-shaped, and the at least one axial groove comprises a first plurality of axial grooves and the at least one position marker comprises a first plurality of position markers, the first plurality of axial grooves spaced around a circumference of the body and extending along a first direction substantially parallel to the longitudinal axis such that each one of the first plurality of position markers is oriented substantially parallel to the longitudinal axis.

In some embodiments, the at least one axial groove comprises at least one second axial groove and the at least one position marker comprises at least one second position marker, the at least one second axial groove positioned between two adjacent ones of the first plurality of axial grooves and extending along a second direction angled relative to the first direction such that the at least one second position marker is disposed at an angle relative to the first plurality of position markers.

In accordance with another broad aspect, there is provided an aircraft-bladed rotor system, comprising a rotor rotatable by a shaft about a longitudinal axis, the rotor having blades with adjustable blade pitch angle, a feedback device coupled to rotate with the rotor and to move along the longitudinal axis with adjustment of the blade pitch angle, the feedback device comprising a body having at least one position marker embedded therein, the body made of a first material having a first magnetic permeability and the at least one position marker comprising a second material having a second magnetic permeability greater than the first magnetic permeability, and at least one sensor positioned adjacent the feedback device and configured for producing, as the feedback device rotates about the longitudinal axis, at least one sensor signal in response to detecting passage of the at least one position marker.

In some embodiments, the at least one sensor is positioned adjacent an exposed surface of the feedback device, and the at least one position marker is embedded in the body substantially flush with the surface.

In some embodiments, the at least one sensor is positioned adjacent an exposed surface of the feedback device, and the at least one position marker is recessed relative to the surface by a predetermined distance.

In some embodiments, the at least one sensor is positioned adjacent an exposed surface of the feedback device, and the at least one position marker extends from the surface by a predetermined distance.

In some embodiments, the feedback device comprises a surface having a first edge and a second edge opposite the first edge, and at least one axial groove is formed in the body and extends from the first edge to the second edge, the at least one axial groove configured to receive the second material therein to form the at least one position marker.

In some embodiments, the at least one axial groove is configured to receive therein a sheet stock made of the second material.

In some embodiments, at least part of the at least one position marker is welded in the at least one axial groove.

In some embodiments, the feedback device further comprises a non-metallic sleeve configured to be positioned over the at least one position marker for holding the at least one position marker in place within the at least one axial groove.

In accordance with yet another broad aspect, there is provided a method for providing feedback for an aircraft-bladed rotor, the rotor rotatable about a longitudinal axis and having blades with adjustable blade pitch angle. The method comprises receiving at least one sensor signal from at least one sensor positioned adjacent a feedback device coupled to rotate with the rotor and to move along the longitudinal axis with adjustment of the blade pitch angle, the feedback device comprising a body having at least one position marker embedded therein, the body made of a first material having a first magnetic permeability and the at least one position marker comprising a second material having a second magnetic permeability greater than the first magnetic permeability, the at least one sensor signal produced by the at least one sensor in response to detecting passage of the at least one position marker as the at least one feedback rotates about the longitudinal axis. The at least one sensor signal is processed to generate a feedback signal indicative of the blade pitch angle of the rotor.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
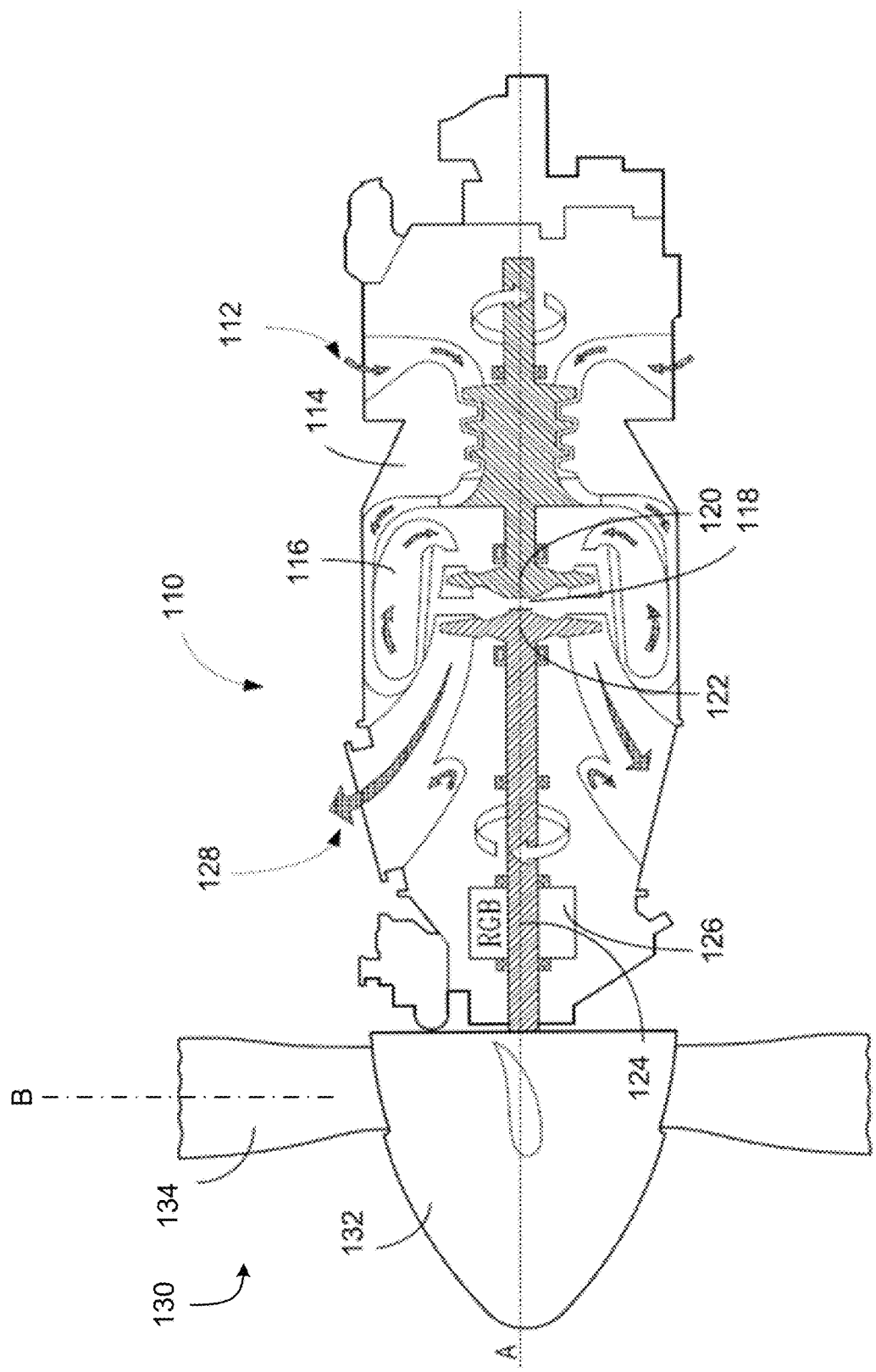
FIG. 1 is a schematic cross-sectional view of an example gas turbine engine.

FIG. 1 depicts a gas turbine engine 110 of a type typically provided for use in subsonic flight. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and rotatingly drives a rotor shaft (also referred to herein as a propeller shaft or an output shaft) 124 about a propeller shaft axis 'A' through a reduction gearbox (RGB) 126. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades 134 connected to a hub by any suitable means and extending radially therefrom. The blades 134 are also each rotatable about their own radial axes through a plurality of blade angles, which can be changed to achieve modes of operation, such as feather, full reverse, and forward thrust.

Figure 2:
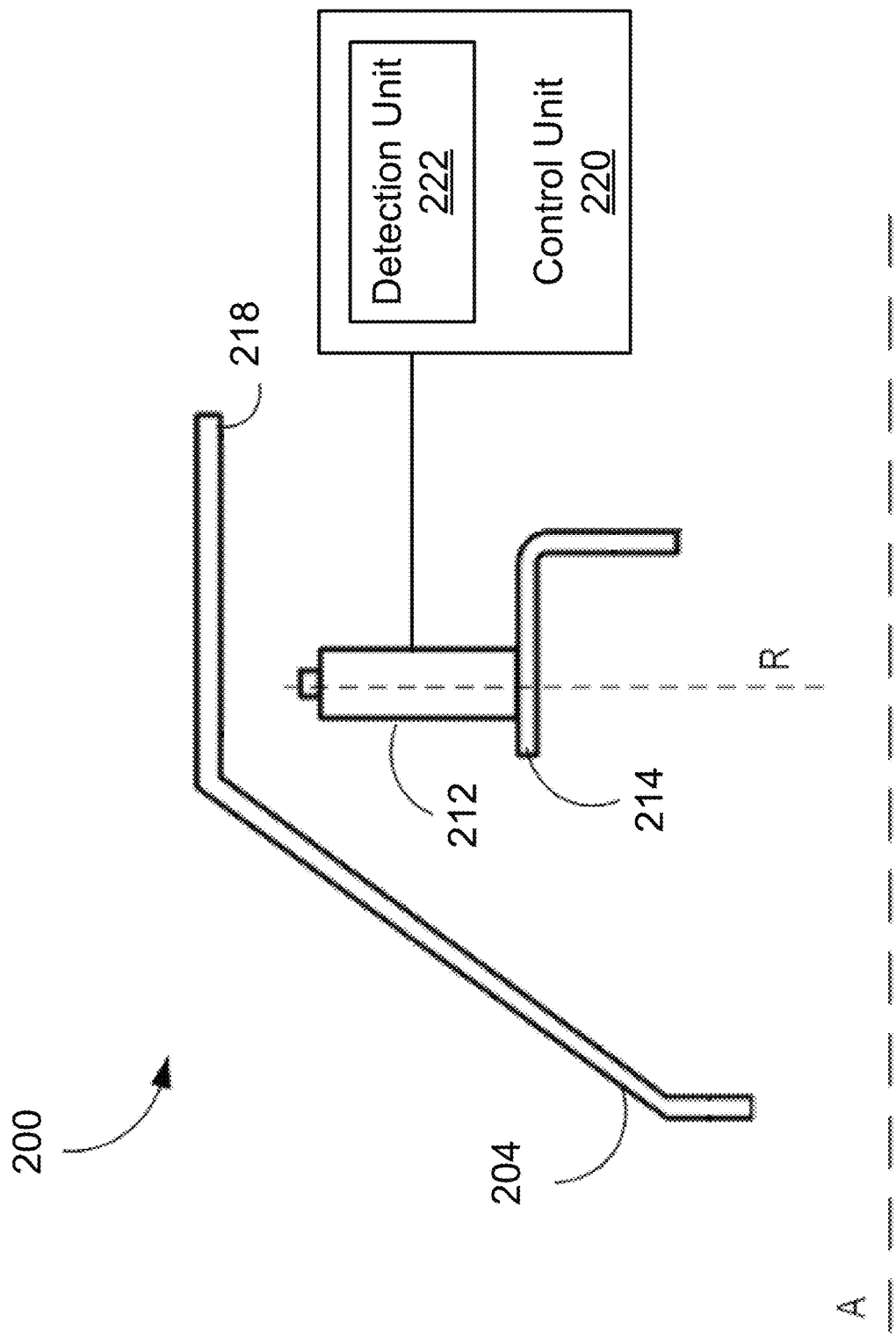
FIG. 2 is a schematic diagram of an example feedback sensing system.

With reference to FIG. 2, a feedback sensing system 200 for pitch-adjustable blades of bladed rotors of aircraft will now be described. The system 200 may be used for sensing a feedback device (also referred to as a feedback ring or phonic wheel) 204 of an aircraft propeller. It should however be understood that, although the system 200 is described and illustrated herein with reference to an aircraft propeller, such as the propeller 130 of FIG. 1, the system 200 may apply to other types of rotors, such as those of helicopters. The systems and methods described herein are therefore not limited to being used for aircraft propellers.

In some embodiments, the system 200 provides for detection and measurement of rotational velocity of one or more rotating elements of the engine 110 and of propeller blade angle on propeller systems, such as the propeller 130 of FIG. 1. The system 200 may interface to existing mechanical interfaces of typical propeller systems to provide a digital detection for electronic determination of the propeller blade angle. It should be noted that although the present disclosure focuses on the use of the system 200 and the feedback device 204 in gas-turbine engines, similar techniques can be applied to other types of engines, including, but not limited to, electric engines and hybrid electric propulsion systems having a propeller driven in a hybrid architecture (series, parallel, or series/parallel) or turboelectric architecture (turboelectric or partial turboelectric).

The system 200 comprises an annular member 204 and one or more sensors 212 positioned proximate the annular member 204. Annular member 204 (referred to herein as a feedback device) has a plurality of circumferentially-spaced apart and detectable features (also referred to as position markers, reference 202 in FIG. 4) disposed thereon for detection by sensor(s) 212. In some embodiments, the detectable features 202 and sensor(s) 212 may be disposed on a radially-outer side of feedback device 204. Alternatively, detectable features 202 and sensor(s) 212 could be disposed on a radially-inner side of feedback device 204. Several detectable features 202 may be spaced equiangularly about the perimeter (also referred to herein as the 'circumference') of the feedback device 204. Other embodiments may apply.

In one embodiment, the one or more sensors 212 are fixedly mounted to a static portion of the engine 110. In other embodiments, the one or more sensors 212 are mounted for rotation with propeller 130 and to move axially with adjustment of the blade angle of the blades of the propeller 130, and the feedback device 204 is fixedly mounted to a static portion of the engine 110.

In some embodiments, the feedback device 204 is mounted for rotation with propeller 130 and to move axially along rotation axis 'A' to a plurality of axial positions, with adjustment of the blade angle of the blades of the propeller 130. An axial position of the feedback device 204 may then correspond to a respective angular (pitch) position of the blades and the position markers 202 may be useful for detecting the axial position of the feedback device 204 as the feedback device 204 and bladed rotor 130 rotate. The feedback device 204 may therefore be useful for detecting the angular position of the adjustable blades by way of correlation.

The system 200 also includes a control unit 220 communicatively coupled to the one or more sensors 212. The sensor(s) 212 are configured for producing a sensor signal which is transmitted to or otherwise received by the control unit 220, for example via a detection unit 222 thereof. The sensor signal can be an electrical signal, digital or analog, or any other suitable type of signal. In some embodiments, the sensor(s) 212 produce a signal pulse in response to detecting the presence of a position marker 202 in a sensing zone of the sensor 212. For example, the sensor 212 is an inductive sensor that operates on detecting changes in magnetic flux, and has a sensing zone which encompasses a circular or rectangular area or volume in front of the sensor 212. The position markers 202 provided on the feedback device 204 may then be made of any suitable material which would cause the passage of the position markers 202 near the sensor(s) 212 to provide a change in magnetic permeability within the magnetic field generated by the sensor 212. When a position marker 202 is present in the sensing zone, or passes through the sensing zone during rotation of the feedback device 204, the magnetic flux in the sensing zone is varied by the presence of the position marker 202 (in other words, a change in magnetic permeability occurs), and the sensor(s) 212 can produce a signal pulse, which forms part of the sensor signal. It should be understood that the sensor 212 may be any suitable sensor other than an inductive sensor, including, but not limited to, a Hall sensor and a variable reluctance sensor.

In the example illustrated in FIG. 2, a side view of a portion of feedback device 204 and sensor 212 is shown. The sensor 212 is mounted to a flange 214 of a housing of the reduction gearbox 126, so as to be positioned adjacent the plurality of position markers 202, which extend away from the feedback device 204 and towards the sensor 212. The sensor 212 may be mounted at any suitable angle relative to the position markers 202. In some embodiments, the sensor 212 is secured to the propeller 130 so as to extend away from the flange 214 and towards the position markers 202 along a radial direction, identified in FIG. 2 as direction 'R'. Sensor 212 and flange 214 may be fixedly mounted, for example to the housing of the reduction gearbox 126, or to any other static element of the engine 110, as appropriate. In some embodiments, a single sensor 212 is mounted in close proximity to the feedback device 204 and the position markers 202. In some other embodiments, in order to provide redundancy as well as multiple signal sources at different axial locations, one or more additional sensors, which may be similar to the sensor 212, are provided.

Figure 3:
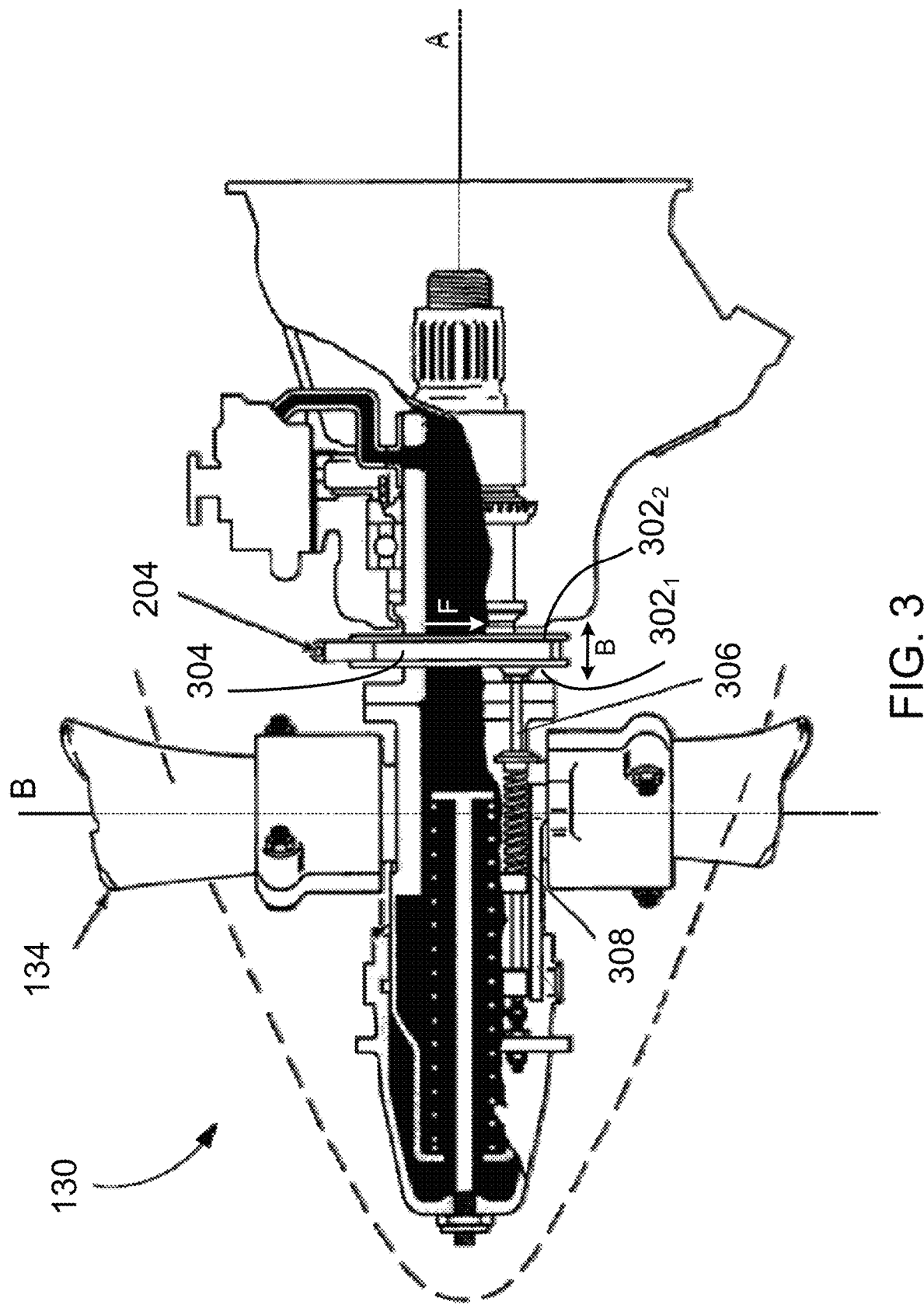
FIG. 3 is a schematic diagram of the propeller of FIG. 1 showing the feedback device of FIG. 2, in accordance with one embodiment.

With additional reference to FIG. 3, in some embodiments the feedback device 204 is embodied as a circular disk which rotates as part of the engine 110, for example with the propeller shaft 124 or with the propeller 130. The feedback device 204 comprises opposing faces (not shown) having outer edges $302_1$, $302_2$ and defines an exposed surface (also referred to as a "root surface") 304 which extends between the opposing faces and circumscribes them. Put differently, the surface 304 of the feedback device 204 is the periphery of the circular disk which spans between the two opposing faces and the root surface 304 intersects the faces at the edges $302_1$, $302_2$. The position markers 202 are illustratively provided on the surface 304 (in a manner that will be discussed in further detail below) and the sensor 212 is configured to be positioned adjacent the surface 304 to detect passage of the position markers 202. As discussed above, in some embodiments, the surface 304 is a radially-outer side of the feedback device 204 whereas in other embodiments, the surface 304 is a radially-inner side of feedback device 204.

As will be discussed further below, the position markers 202 are illustratively embedded (or enclosed) in the circular disk portion of the feedback device 204, such that the feedback device 204 has a substantially smooth or uniform surface 304. For this purpose, the position markers 202 may be manufactured separately from the feedback device 204 and attached thereto using any suitable technique, such as welding or the like. A position marker 202 can then be a portion of the feedback device 204 which is made of a different material, or to which is applied a layer of a different material. The position markers 202 may then be applied to the surface 304, for instance as strips of metal or other material for detection by the sensor 212.

With continued additional reference to FIG. 3, the feedback device 204 is supported for rotation with the propeller 130, which rotates about the longitudinal axis 'A'. The feedback device 204 is also supported for longitudinal sliding movement along the axis A, e.g. by support members, such as a series of circumferentially spaced feedback rods 306 that extend along the axis A. A compression spring 308 surrounds an end portion of each rod 306.

As depicted in FIG. 3, the propeller 130 comprises a plurality of angularly arranged blades 134, each of which is rotatable about a radially-extending axis 'IR' through a plurality of adjustable blade angles, the blade angle being the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full reverse, and forward thrust. Depending on the mode of operation, the blade angle may be positive or negative: the feather and forward thrust modes are associated with positive blade angles, and the full (or maximum) reverse mode is associated with negative blade angles.

Figure 4:
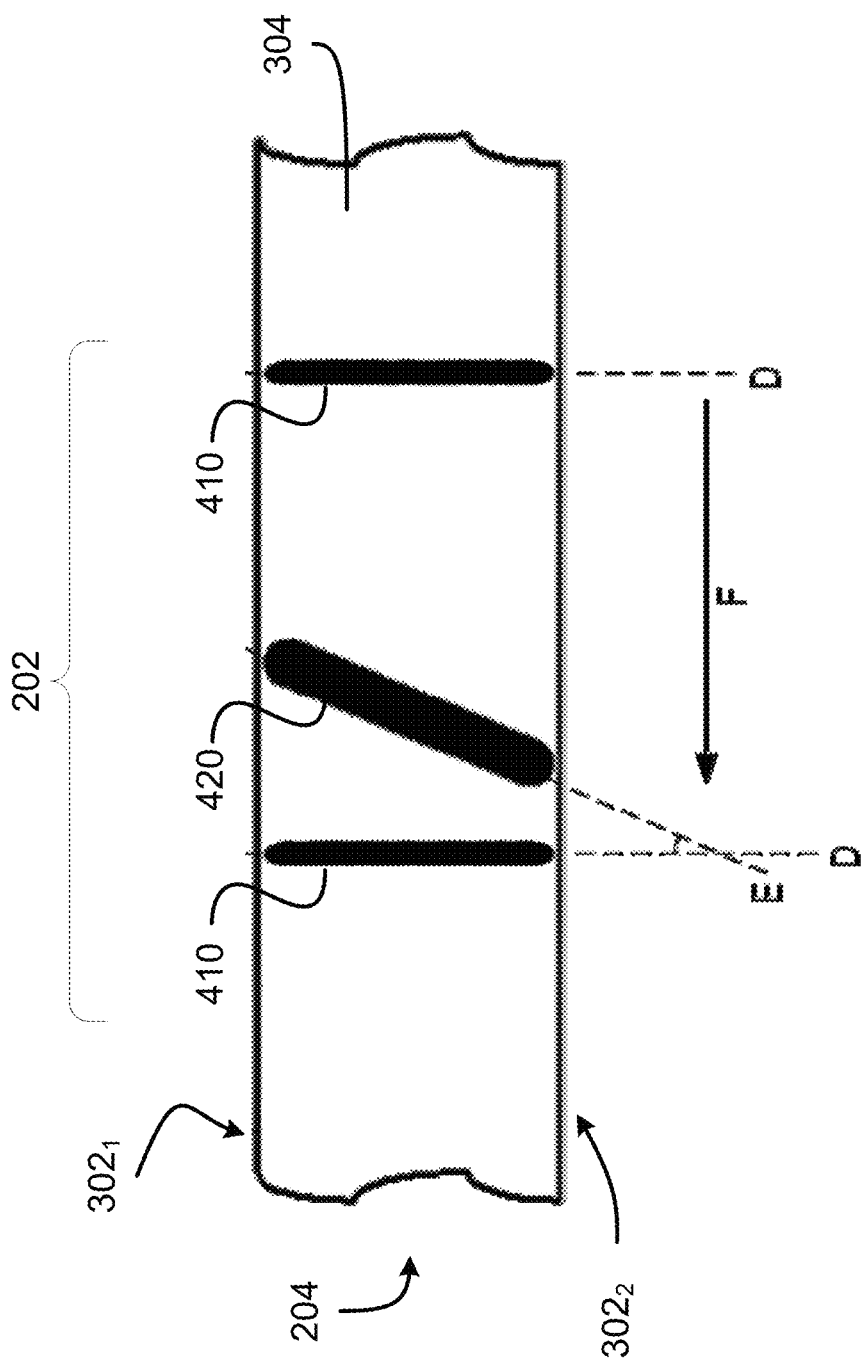
FIG. 4 is a schematic view of a surface of the feedback device of FIG. 2, with position markers provided thereon, in accordance with one embodiment.

Referring now to FIG. 4 in addition to FIG. 2 and FIG. 3, the feedback device 204 illustratively comprises the position markers 202, which are illustratively embedded in the feedback device 204, as discussed above. In one embodiment, the position markers 202 may comprise a plurality of first markers 410 (referred to herein as "straight" markers) arranged along a direction 'ID', which is substantially transverse to the opposing edges $302_1$, $302_2$ (i.e. substantially parallel to the axis A of FIG. 3). Although only two markers 410 are illustrated, it should be understood that any suitable number of markers 410 may be present across the whole of the surface 304. In one embodiment, the markers 410 may be substantially equally spaced from one another on the surface 304. In addition, the markers 410 may, in some embodiments, be of substantially a common shape and size, for example having a common volumetric size. Still, other embodiments are considered.

The position markers 202 may also comprise at least one supplementary (or second) marker 420 (referred to herein as an "angled" or "slanted" marker) which is positioned between two adjacent ones of the first markers 410. Each second marker is illustratively oriented along a direction 'E', which is at an angle relative to the direction 'D' along which the first markers are arranged. The angle between directions 'D' and 'E' can be any suitable value between 1° and 89°, for example 30°, 45°, 60°, or any other value, as appropriate. In some embodiments, the feedback device 204 includes only a single supplementary marker 420. In other embodiments, the feedback device 204 can include more than one (e.g., two, three, four, or more) supplementary marker 420. In embodiments in which the feedback device 204 includes more than one supplementary marker 420, the supplementary markers 420 can all be oriented along a common orientation, for instance direction 'E', or can be oriented along one or more different orientations. The marker 420 can be located at substantially a midpoint between two adjacent markers 410, or, as shown in FIG. 4, can be located close to a particular one of two adjacent markers 410. Other embodiments may apply.

The signal pulses produced by the sensor 212, which form part of the electrical signal received by the control unit 220, can be used to determine various operating parameters of the engine 110 and the propeller 130. In particular, the sensor signal generated by the sensor 212 illustratively comprises a first series of pulses generated in response to detecting the first markers 410 and a second series of pulses generated in response to detecting the second marker(s) 420. The spacing of the first markers 410 (which may, or may not, be regular) can, for example, be used to determine a speed of rotation of the feedback device 204. In addition, the second marker(s) 420 can be detected by the sensor 212 to determine a blade angle of the propeller 130.

With continued reference to FIG. 2, FIG. 3, and FIG. 4, as the feedback device 204 rotates, varying portions thereof enter, pass through, and then exit the sensing zone of the one or more sensors 212. From the perspective of the sensor(s) 212, the feedback device 204 moves axially along axis A and rotates about direction 'F' (shown in FIG. 4).

In order to improve the reading accuracy of the sensor(s) 212 and reduce weight, it is proposed herein to provide a feedback device 204 having high permeability detection markers 202 embedded in a lower permeability (or non-metallic) body (also referred to herein as a core). The feedback device 204 may indeed comprise a body 502, which illustratively includes the surface 304 and is made of a first material having a first magnetic permeability. In one embodiment, the body 502 is made of a metallic material (including, but not limited to, aluminium). In another embodiment, the body 502 is made of a thermoplastic or other light-weight non-metallic material. As illustrated for example in FIG. 5A, one or more first axial grooves 504 and one or more second axial grooves 506 may be formed in the body 502 at locations where detectable features are to be provided. In order to form the high magnetic permeability marker(s) 202, the one or more axial grooves (or recesses) 504, 506 may then be provided (using any suitable technique) with a second material (referred to herein as a "high magnetic permeability material") having a second magnetic permeability that is higher than the first magnetic permeability. The high magnetic permeability markers may be straight and/or slanted markers and may have any suitable configuration, shape, size, and orientation, with the axial grooves 504, 506 being configured to achieve the desired configuration, shape, size, and orientation.

The high magnetic permeability material is configured to increase the change in magnetic flux generated by the passage of the position markers 202 in the sensing zone of the sensor 212. Indeed, as known to those skilled in the art, a high magnetic permeability material works by providing a path for magnetic field lines around the area covered by the material. In one embodiment, Mu-metal (which has relative permeability values of 80,000 to 100,000 compared to several thousand for ordinary steel) is used as the high magnetic permeability material. It should however be understood that materials other than Mu-metal may apply. Such materials include, but are not limited to, ferrite ceramics, permalloy, and supermalloy. Steel or nickel may also be used. It should indeed be understood that, although reference is made herein to a "high" magnetic permeability material (and accordingly "high" magnetic permeability markers), it is desirable for the magnetic permeability of the second material to be higher than the magnetic permeability of the first material, as discussed above. In other words, metals that do not have the highest magnetic permeability may be used for the second material, with the first (or base) material being, for example, a non-metallic low permeability material, such as thermoplastic.

It should also be understood that the characteristics (e.g., type and thickness) of the second material may be specific to the application, the parameters (e.g. engine configuration) specific to that application, the distance of the sensor(s) 212 relative to the feedback device 204, the geometry of the feedback device 204 (e.g., available space according to clearances and tolerance stackup of the feedback sensing system 200), and any reading error (also referred to as "beta error") experienced by the feedback sensing system 200.

Figure 5A:
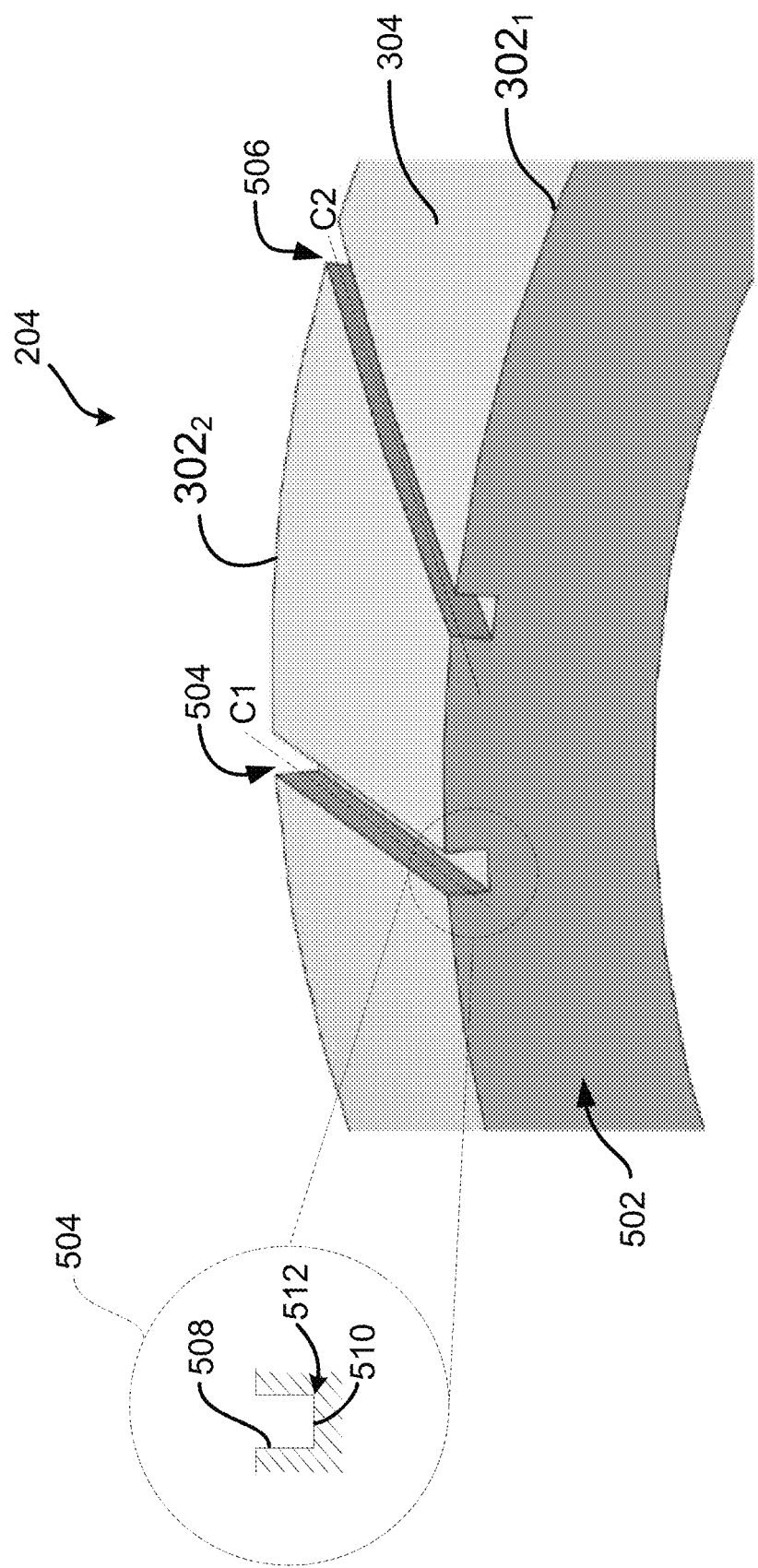
FIG. 5A is a schematic diagram of axial grooves formed in a feedback device to provide embedded markers in the feedback device, in accordance with one embodiment.
Figure 5B:
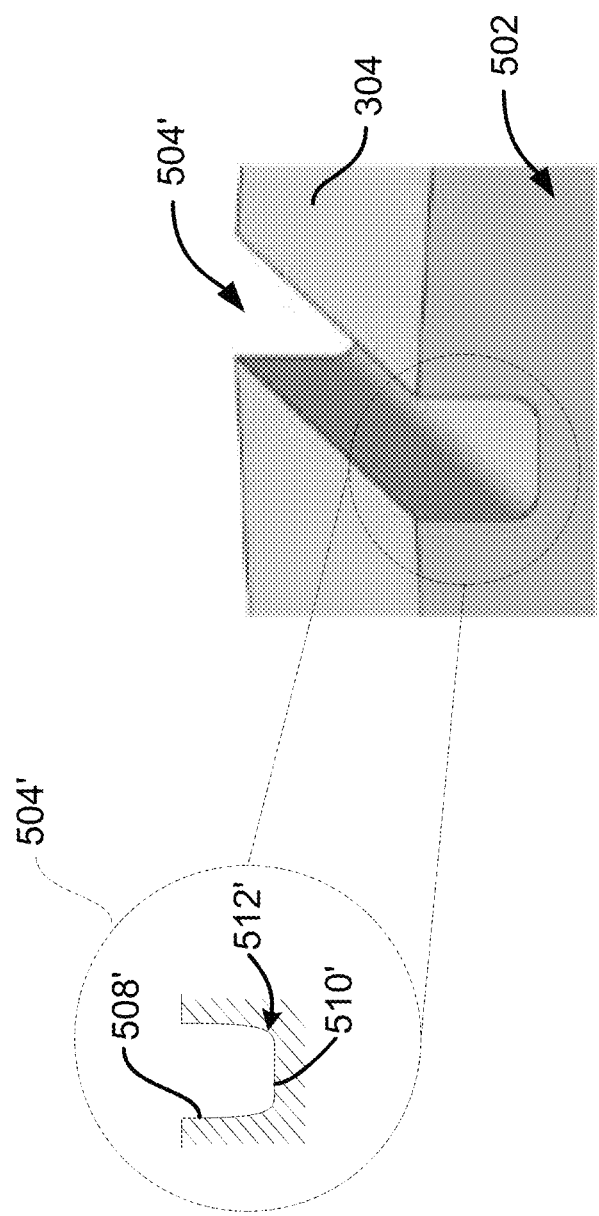
FIG. 5B is a schematic diagram of an axial groove formed in a feedback device to provide an embedded marker in the feedback device, in accordance with another embodiment.
Figure 5C:
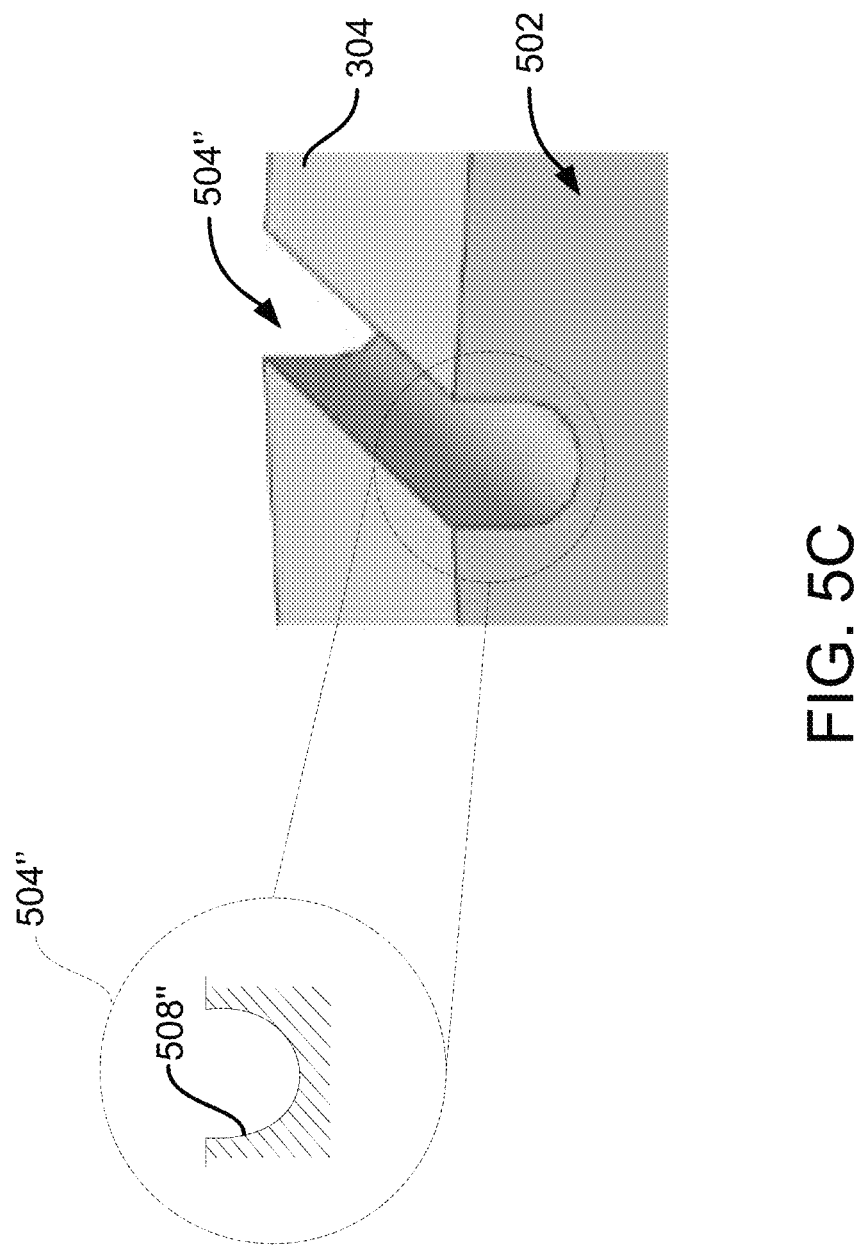
FIG. 5C is a schematic diagram of an axial groove formed in a feedback device to provide an embedded marker in the feedback device, in accordance with yet another embodiment.

Referring to FIG. 5A, FIG. 5B, FIG. 5C, in one embodiment, the one or more first and second axial grooves 504 extend from a first one of the edges $302_1$, $302_2$ to the other one of the edges $302_1$, $302_2$. The first axial grooves 504 extend along a direction 'C1', which is substantially transverse to the opposing edges $302_1$, $302_2$ of the feedback device 204 (and substantially aligned with the direction D, shown in FIG. 4, along which the straight markers 410 are to be arranged). The second axial grooves 506 extend along a direction 'C2' that is angled relative to the direction C1 (and substantially aligned with the direction E, shown in FIG. 4, along which the angled markers 420 are to be arranged). In one embodiment, all position markers 202 (i.e. both straight markers 410 and angled markers 420) are high magnetic permeability markers and all axial grooves 504, 506 are provided with the high magnetic permeability material. In other words, providing the high magnetic permeability material in the first axial grooves 504 creates the straight markers 410 and providing the high magnetic permeability material in the second axial grooves 506 creates the angled markers 420. Other embodiments may apply and it should be understood that the number of high magnetic permeability markers that are provided on the feedback device 204 may depend on factors including, but not limited to, engine and/or feedback device configuration and required accuracy for the feedback sensing system 200. Indeed, providing an increased number of high magnetic permeability markers may allow to increase the strength of the sensor signal, and accordingly improve accuracy.

The cross-sectional shape of the axial grooves 504, 506 may also vary, depending on engine and/or feedback device configuration. In one embodiment (illustrated in FIG. 5A), the axial grooves 504, 506 may have a rectangular cross-section. Each axial groove 504, 506 may indeed be defined (or bounded) by a pair of opposing side walls 508 and a bottom wall 510, with a right angle being formed at the intersection of each side wall 508 and the bottom wall 510 to create a sharp edge 512. In another embodiment, the axial grooves (illustrated by axial groove 504' in FIG. 5B) may have a U-shaped cross-section. Each axial groove 504' may indeed comprise a pair of opposing side walls 508' and a bottom wall 510', with a rounded edge 512' being formed at the intersection of a side wall 508' and the bottom wall 510'. In yet another embodiment, the axial grooves (illustrated by axial groove 504" in FIG. 5C) may have a semi-circular cross-section. Each axial groove 504' may indeed comprise a semi-circular wall 508". Provision of the rounded edges (e.g., as in 512') or semi-circular cross-section may be desirable in the event where, in operation, stress is likely to be exerted on the feedback device 204, and more particularly on the position markers 202. Other suitable cross-sectional shapes for the axial grooves 504, 506 may apply.

Figure 6A:
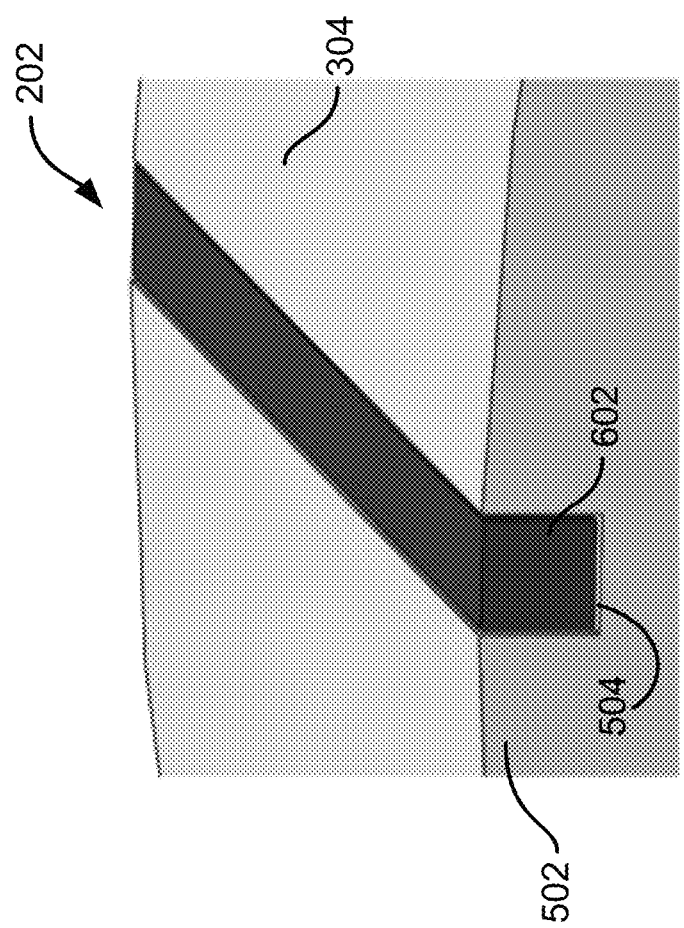
FIG. 6A is a schematic diagram of a feedback device with an embedded marker provided therein, in accordance with one embodiment.
Figure 6B:
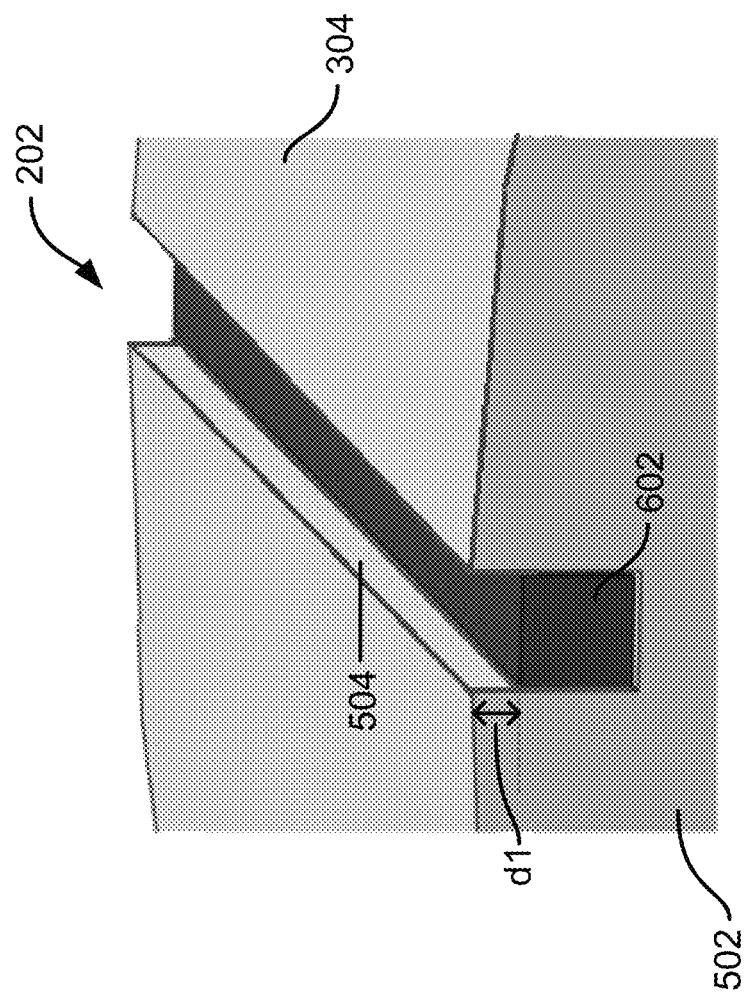
FIG. 6B is a schematic diagram of a feedback device with an embedded marker provided therein, in accordance with another embodiment.

Referring now to FIG. 6A and FIG. 6B in addition to FIG. 5A, FIG. 5B, FIG. 5C, the high magnetic permeability markers (reference 202 in FIG. 6A and FIG. 6B) may be provided using any suitable process. In one embodiment, a sheet 602 of the high magnetic permeability material (referred to herein as a "sheet stock") may be inserted into a given axial groove 504, 506 and welded therein to create a high magnetic permeability marker 202. In one embodiment, the sheet stock 602 is a Mu-metal sheet stock having a thickness between about 0.014 inches and 0.125 inches (i.e. between about 0.36 mm and 3.18 mm). In some embodiments, only part of the sheet stock 602 is welded into the axial groove 504, 506 to hold the sheet stock 602 in place within the given axial groove 504, 506. In other embodiments, the entirety of the sheet stock 602 is welded into the axial groove 504, 506. When the marker 202 is welded into the axial groove 504, 506 in such a manner, the number and location of the welds may depend on engine and/or feedback device configuration.

Figure 6C:
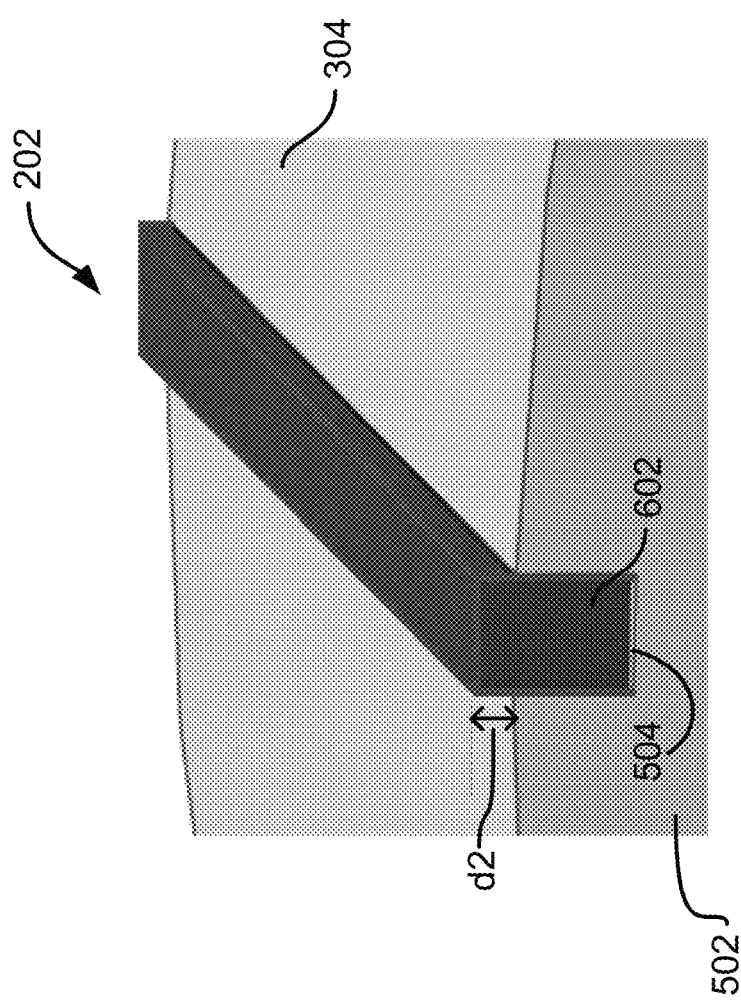
FIG. 6C is a schematic diagram of a feedback device with an embedded marker provided therein, in accordance with yet another embodiment.
Figure 6D:
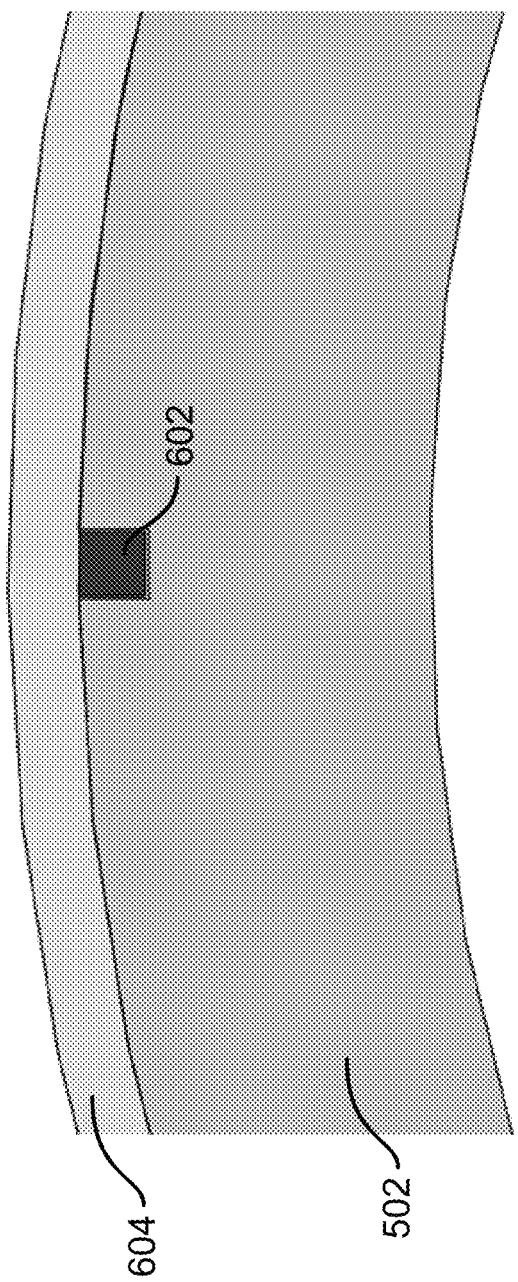
FIG. 6D is a schematic cross-sectional view of a feedback device with an embedded marker and sleeve, in accordance with one embodiment.

Referring now to FIG. 6D in addition to FIG. 6A, FIG. 6B, and FIG. 6C, alternatively, instead of welding the sheet stock 602 into the axial groove 504, 506, a non-metallic sleeve 604 may be positioned over the sheet stock 602 (and accordingly over the marker 202) to hold the sheet stock 602 (and accordingly over the marker 202) in place within the given axial groove 504, 506. In one embodiment, the sleeve 604 may be configured to cover the exposed surface 304 of the feedback device 204 and may accordingly have a thickness that is suitable to hold the sheet stock 602 in place yet avoid increasing the total air gap of the magnetic circuit of the feedback sensing system 200. Since maintaining the air gap affects magnetic flux density and signal quality, the proposed configuration of the feedback device 204 may improve the reading accuracy of the overall feedback sensing system 200. It should be understood that any suitable means for retaining the sheet stock 602 within the given axial groove 504, 506 (other than use of welding or of a non-metallic sleeve) may apply.

Other techniques for providing the high magnetic permeability marker(s) 202 may also apply. For example, the high magnetic permeability material may be plated (e.g., using electro-plating, electro-forming, or the like) on the axial grooves 504, 506 to create the high magnetic permeability marker(s). The markers 202 may be manufactured separately by machining, additive manufacturing to deposit layers of high permeability material in the axial grooves 504, 506, or any other suitable method may also be used to provide the high magnetic permeability marker(s) (e.g., to create the axial grooves 504, 506 and/or provide the high magnetic permeability material therein).

In one embodiment illustrated in FIG. 6A, the high magnetic permeability material (illustrated as sheet stock 602) may be positioned in the axial groove 504, 506 such that the resulting high magnetic permeability marker 202 is substantially flush with the surface 304 of the feedback device 204. It should however be understood that, in another embodiment illustrated in FIG. 6B, the high magnetic permeability material (illustrated as sheet stock 602) may be positioned in the axial groove 504, 506 such that the high magnetic permeability marker 202 is recessed in the body 502 of the feedback device 204. In this case, the high magnetic permeability marker 202 is recessed relative to the surface 304 by a predetermined distance d1, the value of which may depend on engine and/or feedback device configuration The distance d1 by which the marker 202 is recessed may be determined based on the optimal air gap for the system as well as manufacturing constraints including, but not limited to, the size of a fillet weld (not shown) between sides of the axial groove 504, 506 and the top (not shown) of the marker 202. It should also be understood that, in other embodiments (as illustrated in FIG. 6C), the marker 202 may project slightly above (i.e. extend from) the surface 304 by a distance d2 which may also be determined based on the optimal air gap (e.g., where the marker 202 may need to be closer to the sensor 212 to increase the sensor signal) as well as manufacturing constraints.

Figure 7:
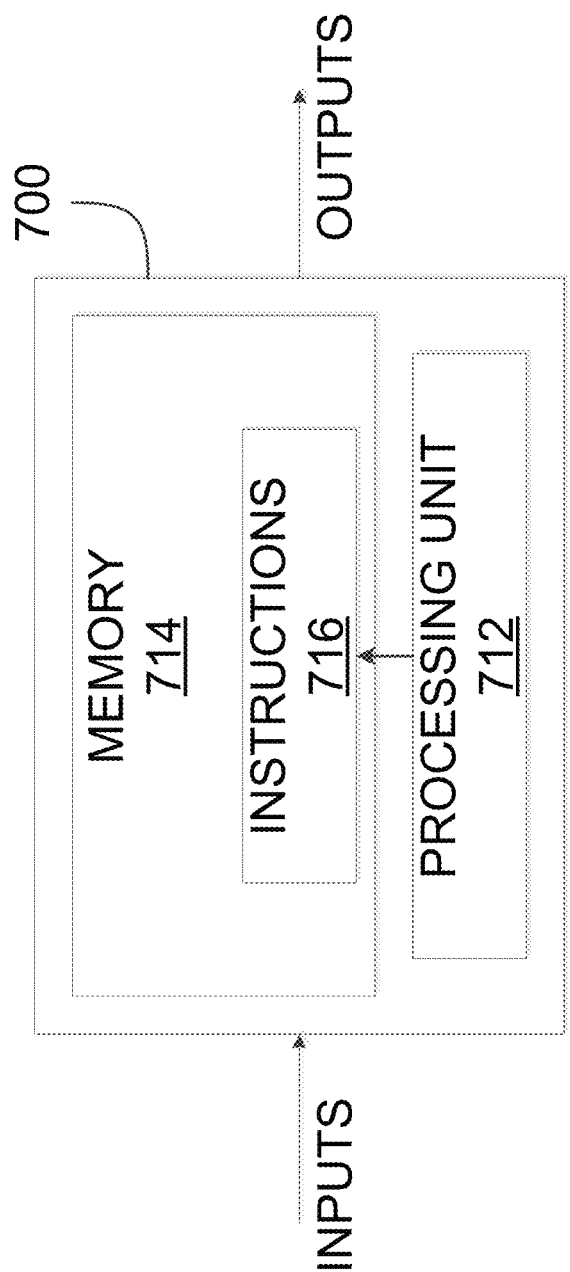
FIG. 7 is a block diagram of an example computing system for implementing the control unit of FIG. 2, in accordance with an embodiment.

FIG. 7 is an example embodiment of a computing device 700 for implementing the control unit 220 described above with reference to FIG. 2. The computing device 700 comprises a processing unit 702 and a memory 704 which has stored therein computer-executable instructions 706. The processing unit 702 may comprise any suitable devices configured to cause a series of steps to be performed such that instructions 706, when executed by the computing device 700 or other programmable apparatus, may cause the functions/acts/steps specified in the method described herein to be executed. The processing unit 702 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 704 may comprise any suitable known or other machine-readable storage medium. The memory 704 may comprise non-transitory computer readable storage medium, for example, but not limited to, an electronic, magnetic, optical, electromagnetic, infrared, or semiconductor system, apparatus, or device, or any suitable combination of the foregoing. The memory 704 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 704 may comprise any storage means (e.g., devices) suitable for retrievably storing machine-readable instructions 706 executable by processing unit 702.

The methods and systems described herein may be implemented in a high level procedural or object oriented programming or scripting language, or a combination thereof, to communicate with or assist in the operation of a computer system, for example the computing device 700. Alternatively, the methods and systems may be implemented in assembly or machine language. The language may be a compiled or interpreted language. Program code for implementing the methods and systems for detection may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 712 of the computing device 700, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A blade angle feedback system for a bladed rotor of an aircraft, the bladed rotor rotatable about an axis and having blades rotatable about respective spanwise axes to adjust a blade pitch angle, the system comprising:
   a feedback device comprising an annular-shaped body having at least one position marker enclosed therein, the body made of a first material having a first magnetic permeability and the at least one position marker comprising a second material having a second magnetic permeability greater than the first magnetic permeability, the feedback device further comprising a surface having a first edge and a second edge opposite the first edge, and at least one axial groove formed in the body and extending from the first edge to the second edge, the at least one axial groove configured to receive the second material therein to form the at least one position marker, the at least one axial groove comprising a first plurality of axial grooves and the at least one position marker comprising a first plurality of position markers, the first plurality of axial grooves spaced around a circumference of the body and extending along a first direction substantially parallel to the axis such that each one of the first plurality of position markers is oriented substantially parallel to the axis;
   at least one sensor configured for producing at least one sensor signal in response to detecting a relative movement between the at least one sensor and the at least one position marker, the at least one sensor signal indicative of the blade pitch angle of the blades; and
   a control unit communicatively coupled to the at least one sensor and configured to generate a feedback signal indicative of the blade pitch angle in response to the at least one sensor signal received from the at least one sensor.

2. The feedback system of claim 1, wherein the at least one sensor is positioned adjacent an exposed surface of the feedback device, and further wherein the at least one position marker is embedded in the body substantially flush with the surface.

3. The feedback system of claim 1, wherein the at least one sensor is positioned adjacent an exposed surface of the feedback device, and further wherein the at least one position marker is recessed relative to the surface by a predetermined distance.

4. The feedback system of claim 1, wherein the at least one sensor is positioned adjacent an exposed surface of the feedback device, and further wherein the at least one position marker extends from the surface by a predetermined distance.

5. The feedback system of claim 1, wherein the at least one axial groove has one of a rectangular cross-section, a semi-circular cross-section, and a U-shaped cross-section.

6. The feedback system of claim 1, wherein the at least one axial groove is configured to receive therein a sheet stock made of the second material.

7. The feedback system of claim 1, wherein at least part of the at least one position marker is welded in the at least one axial groove.

8. The feedback system of claim 1, wherein the feedback device further comprises a non-metallic sleeve configured to be positioned over the at least one position marker for holding the at least one position marker in place within the at least one axial groove.

9. The feedback system of claim 1, wherein the at least one axial groove comprises at least one second axial groove and the at least one position marker comprises at least one second position marker, the at least one second axial groove positioned between two adjacent ones of the first plurality of axial grooves and extending along a second direction angled relative to the first direction such that the at least one second position marker is disposed at an angle relative to the first plurality of position markers.

* * * * *